United States Patent
Redpath (10) Patent No.: US 9,686,246 B2
(45) Date of Patent: *Jun. 20, 2017

(54) ISSUING, PRESENTING AND CHALLENGING MOBILE DEVICE IDENTIFICATION DOCUMENTS

(71) Applicant: International Business Machines Corporation, Armonk, NY (US)

(72) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,623

(22) Filed: May 11, 2015

(65) Prior Publication Data
US 2015/0249648 A1 Sep. 3, 2015

Related U.S. Application Data

(63) Continuation of application No. 13/915,086, filed on Jun. 11, 2013, now Pat. No. 9,065,805, which is a continuation of application No. 13/540,685, filed on Jul. 3, 2012, now Pat. No. 9,059,972.

(51) Int. Cl.
*H04L 29/06* (2006.01)

(52) U.S. Cl.
CPC ........ *H04L 63/0428* (2013.01); *H04L 63/062* (2013.01); *H04L 63/12* (2013.01); *H04L 63/18* (2013.01); *H04L 63/0823* (2013.01)

(58) Field of Classification Search
CPC ..... H04L 63/0428; H04L 63/18; H04L 63/12; H04L 63/0823; H04L 63/062
See application file for complete search history.

(56) References Cited

U.S. PATENT DOCUMENTS

| 6,622,015 B1 | 9/2003 | Himmel et al. |
| 7,028,012 B2 | 4/2006 | St. Vrain et al. |
| 7,920,851 B2 | 4/2011 | Moshir et al. |

(Continued)

FOREIGN PATENT DOCUMENTS

| GB | 2412544 A | 9/2005 |
| KR | 101084347 B1 | 11/2011 |

OTHER PUBLICATIONS

Stephen P. McGrew, "Hologram Counterfeiting: Problem and Solutions", www.blackmarket-press.net, downloaded May 21, 2012, 8 pages.

(Continued)

*Primary Examiner* — Jung Kim
*Assistant Examiner* — Tri Tran
(74) *Attorney, Agent, or Firm* — Jordan IP Law, LLC (57) ABSTRACT

Methods and systems of authenticating electronic identification (ID) documents may provide for receiving a decryption key and an encrypted ID document from a certificate authority server at a mobile device, wherein the encrypted ID document includes a read only document having a photograph of an individual. Additionally, the decryption key may be applied to the encrypted ID document to obtain a decryption result in response to a display request. The decryption result can be output via a display of the mobile device, wherein the encrypted ID document can be sent to a challenge terminal if a challenge request is received.

19 Claims, 4 Drawing Sheets

(56) References Cited

U.S. PATENT DOCUMENTS

| | | |
|---|---|---|
| 8,215,546 B2 | 7/2012 | Lin et al. |
| 2001/0037309 A1 | 11/2001 | St. Vrain et al. |
| 2003/0023858 A1 | 1/2003 | Banerjee et al. |
| 2005/0138386 A1 | 6/2005 | Le Saint |
| 2008/0279380 A1* | 11/2008 | Hayashi .................. G09C 5/00 380/243 |
| 2011/0302412 A1 | 12/2011 | Deng et al. |
| 2012/0021762 A1 | 1/2012 | Garin et al. |
| 2012/0112882 A1 | 5/2012 | Martinez de Velasco et al. |
| 2013/0166643 A1 | 6/2013 | Essas |

OTHER PUBLICATIONS

"Fake ID Sites Reviewed", www.underground-review.com, Oct. 2004, 2 pages.
"Close up Proof we Produce the Best Fake ID Online" www.link-i-d.com, downloaded May 21, 2012, 4 pages.
Non-Final Office Action for U.S. Appl. No. 13/540,685, mailed May 15, 2014, 26 pages, U.S. Patent and Trademark Office.
Final Office Action for U.S. Appl. No. 13/540,685, mailed Oct. 24, 2014, 22 pages, U.S. Patent and Trademark Office.
Notice of Allowance and Fees Due for U.S. Appl. No. 13/540,685, mailed Feb. 9, 2015, 15 pages, U. S. Patent and Trademark Office.
Non-Final Office Action for U.S. Appl. No. 13/915,086, mailed May 9, 2014, 18 pages, U.S. Patent and Trademark Office.
Final Office Action received for U.S. Appl. No. 13/915,086, mailed Oct. 24, 2014, 20 pages, U.S. Patent and Trademark Office.
Notice of Allowance and Fees Due for U.S. Appl. No. 13/915,086, mailed Feb. 9, 2015, 13 pages, U. S. Patent and Trademark Office.

* cited by examiner

ISSUING, PRESENTING AND CHALLENGING MOBILE DEVICE IDENTIFICATION DOCUMENTS

CROSS-REFERENCED TO RELATED APPLICATIONS

The present application is a continuation of U.S. patent application Ser. No. 13/915,086 filed on Jun. 11, 2013, which is a continuation of U.S. patent application Ser. No. 13/540,685 filed on Jul. 3, 2012.

BACKGROUND

Embodiments of the present invention generally relate to identification documents. More particularly, embodiments relate to the authentication of electronic identification documents.

Driver's licenses and other identification documents may be issued by state governments to individuals, wherein the individuals may be required to present the licenses to various other third parties such as airport security, customs, immigration, police, nightclubs, controlled beverage stores, banks, credit card merchant account processors, firearm vendors, military sites, employers, etc. A common security concern may exist at a local, state, national, and even global level with regard to the creation and use of forged (e.g., fake) driver's licenses. Indeed, a significant market may exist for forged driver's licenses that might be used as false evidence of U.S. citizenship. For example, certain counterfeiters may be able to recreate watermarks, holograms, UV (ultraviolet) veneer coatings, etc., on physical licenses to a high level of precision and in many different contexts. While the use of electronic identification (ID) documents may be a potential solution, there remains considerable room for improvement. For example, the need to be able to present licenses to a wide variety of third parties can pose implementation difficulties that may not be addressed by conventional electronic ID solutions.

BRIEF SUMMARY

Embodiments may include a computer program product having a computer readable storage medium and computer usable code stored on the computer readable storage medium. If executed by a processor, the computer usable code may cause a certificate authority server to receive a document request, and apply an encryption key to an identification (ID) document to obtain an encrypted ID document in response to the document request. Additionally, the computer usable code, if executed, may cause the certificate authority server to use an application download to send the encrypted ID document and a decryption key associated with the encryption key to a mobile device.

Embodiments may include a computer program product having a computer readable storage medium and computer usable code stored on the computer readable storage medium. If executed by a processor, the computer usable code may cause a mobile device to apply a decryption key to an encrypted ID document to obtain a decryption result in response to a display request, and output the decryption result via a display of the mobile device. Additionally, the computer usable code, if executed, may cause the mobile device to send the encrypted identification document to a challenge terminal if a challenge request is received.

Embodiments may also include a computer program product having a computer readable storage medium and computer usable code stored on the computer readable storage medium. If executed by a processor, the computer usable code may cause a challenge terminal to obtain a decryption key originating from a certificate authority, and receive an encrypted ID document from a mobile device in accordance with a challenge request. Additionally, the computer usable code, if executed, may cause the challenge terminal to apply the decryption key to the encrypted ID document to obtain a decryption result. In one example, the decryption result is output via a display of the challenge terminal.

Embodiments may also include a method of operating a mobile device in which a decryption key and an encrypted ID document are received from a certificate authority server, wherein the encrypted ID document includes a read only document having a photograph of an individual. The decryption key can be applied to the encrypted ID document to obtain a decryption result in response to a display request. Additionally, the method may provide for outputting the decryption result via a display of the mobile device, and sending the encrypted ID document to a challenge terminal via a wireless interface of the mobile device if a challenge request is received.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
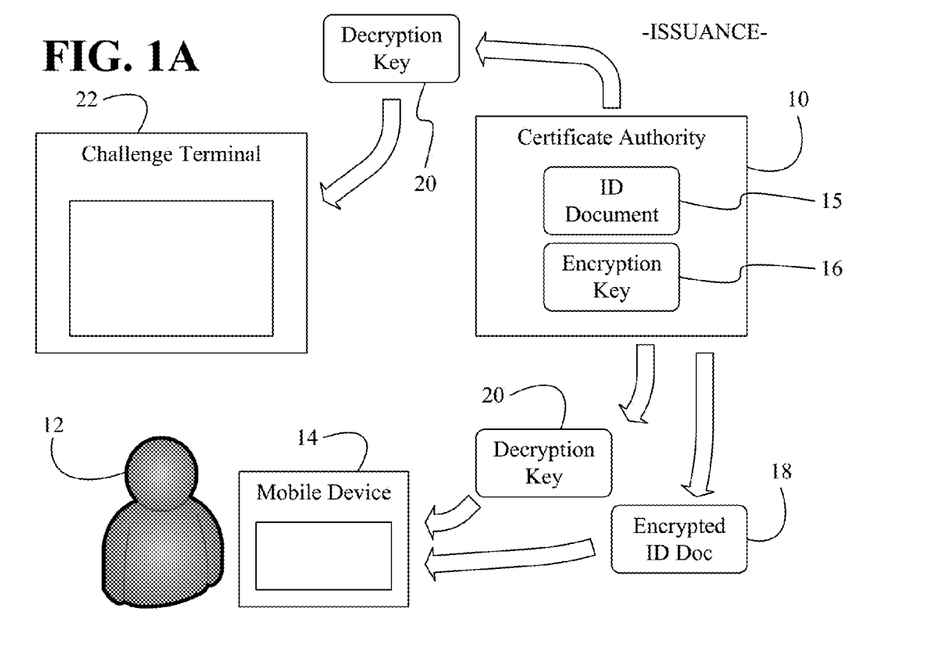
FIGS. 1A-1C are block diagrams of examples of issuance, presentation and challenge stages of an electronic ID document according to an embodiment.
Figure 1B:
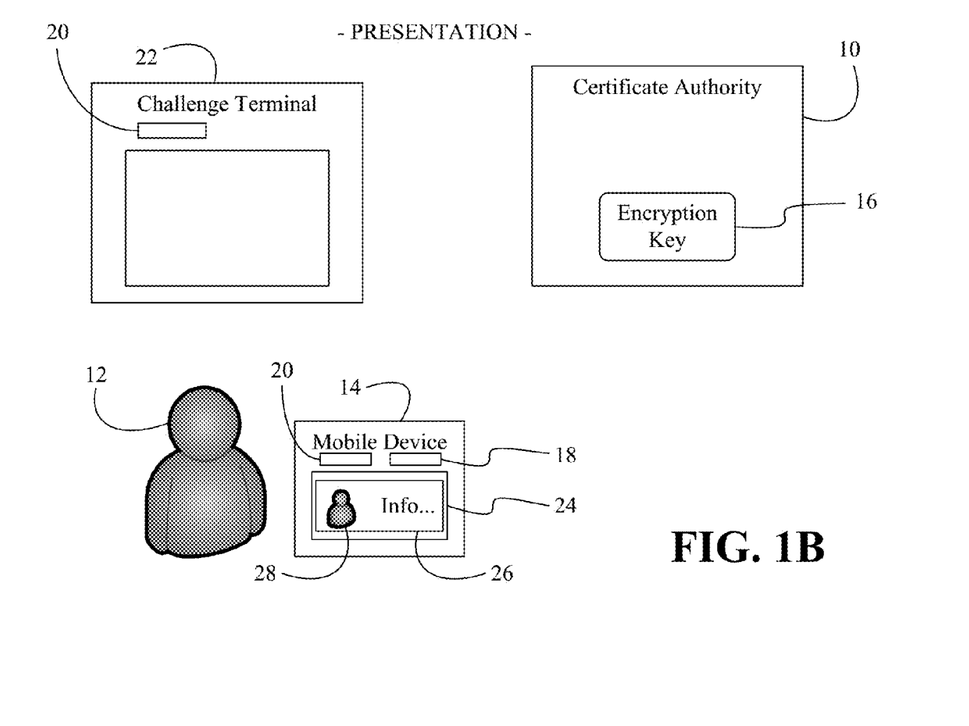
Figure 1C:
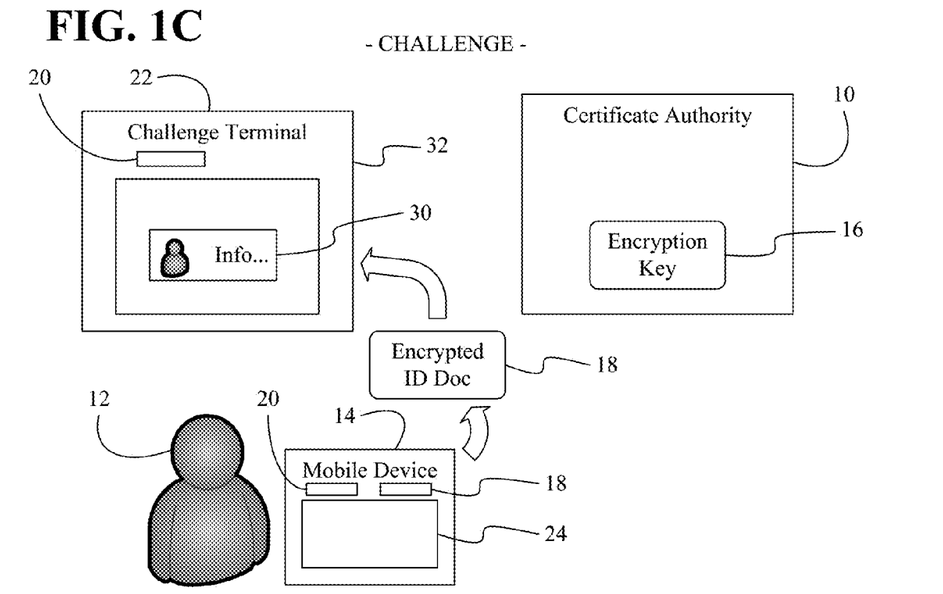

Referring now to FIGS. 1A-1C, issuance, presentation, and challenge stages of an electronic identification (ID) document are shown, respectively. With specific reference to FIG. 1A, a certificate authority 10 may respond to a document request from a user/individual 12 having a mobile device 14 such as a smart phone, smart tablet, personal digital assistant (PDA), and so forth. The certificate authority 10 may be associated with, for example, a state department of motor vehicles (DMV) that is authorized to issue driver's licenses and other ID documents to individuals such as the user 12. In one example, the user is required to pay for the requested electronic ID document, wherein the certificate authority 10 might verify payment for the ID document by the user 12 prior to issuing the requested document. The certificate authority 10 could also verify other aspects of the document request such as the satisfactory completion of various driver licensing requirements (e.g., age, written certification, road certification, vision certification, etc.).

Upon verifying the appropriate document issuance requirements, the illustrated certificate authority applies an encryption key 16 to an ID document 15 to obtain an encrypted ID document 18, wherein the encrypted ID document 18 may constitute, for example, a read only driver's license having a photograph of the user 12. Other examples of photo ID documents that may be encrypted include, but are not limited to, passports, military IDs, and employment IDs, the certificate authority 10 may then send the encrypted ID document 18 along with a decryption key 20 associated with the encryption key 16 to the mobile device 14. In one example, the certificate authority 10 applies a signature to an expiration date of the encrypted ID document 18 prior to sending them to the mobile device 14. Such an expiration date signature could be particularly advantageous with regard to driver's licenses, temporary employee ID badges, etc. The decryption key 20 may also be packaged as a password protected PK12 file or a non-password protected PK8 file. Indeed, the encrypted ID document 18 and decryption key 20 might be packaged together into an application (e.g., Android License Identity/ALI app) that is signed and downloaded onto the mobile device 14 via a wired or wireless connection. Of particular note is that the illustrated certificate authority 10 maintains the encryption key 16 in a secure state that is inaccessible by other parties. Moreover, the read only nature of the encrypted ID document 18 can further reduce the likelihood of tampering with the underlying photograph and/or other ID content.

The certificate authority 10 may also make the decryption key 20 generally available to other parties and/or devices such as, for example, a challenge terminal 22. The challenge terminal may be associated with another entity such as, for example, airport security (e.g., Transportation Security Administration/TSA), police (e.g., state and/or local), nightclubs, controlled beverage stores, banks, credit card merchant account processors, firearm vendors, military sites, employers, etc. For example, the certificate authority 10 could publish the decryption key to an appropriate publication source such as a web portal, directory, listing, subscription service, etc. As will be discussed in greater detail, the challenge terminal 22 may also obtain the decryption key 20 from the certificate authority directly via a key request, and so forth.

With particular reference to FIG. 1B, a presentation stage is shown. Generally, upon receipt of the encrypted ID document 18 and decryption key 20 from the certificate authority 10 on the mobile device 14, the encrypted ID document 18 and decryption key 20 may be stored to local memory on the mobile device 14 and the illustrated user 12 may carry the mobile device 14 with him or her in place of a physical ID document. More particularly, if the user 12 enters a physical area associated with the challenge terminal 22 and is asked (e.g., by police officer, TSA agent, bouncer, etc., not shown) to present identification, the user 12 may use a touch screen 24 or other suitable user interface (UI) of the mobile device 14 to initiate a display request. Indeed, the user 12 may even be remote from the challenge terminal 22, wherein the user 12 might participate in a video conferencing session (e.g., Skype session) with the person checking the ID of the user 12. In response to the display request, the mobile device 14 may apply the decryption key 20 to the encrypted ID document 18 to obtain a decryption result 26, and output the decryption result 26 via the touch screen 24 or other appropriate display of the mobile device. Accordingly, the user 12 may then show the decryption result 26 to the requesting individual (e.g., police officer, TSA agent, bouncer, etc.) associated with the challenge terminal 22.

As already noted, the encrypted ID document 18 may include a photograph 28 of the user 12 or of the person whom the user 12 is impersonating. Thus, the requesting individual associated with the challenge terminal 22 may decide based on, for example, visual differences between the user 12 and the photograph 28, suspicions regarding the identity, age, residence and/or citizenship of the user 12, random selection, etc., that the displayed decryption result 26 may not be trustworthy. In such a case, the requesting individual associated with the challenge terminal 22 can instruct the user 12 to initiate a challenge request on the mobile device 14.

FIG. 1C demonstrates that the challenge request, which may be initiated via the touch screen 24 or other suitable UI of the mobile device 14, can cause the mobile device 14 to send the encrypted ID document 18 to the challenge terminal 22. In one example, the information is transferred to the challenge terminal 22 via a wireless interface (e.g., Bluetooth, infrared/IR, Wi-Fi, NFC/Near Field communication, etc., not shown). In another example, a "bump" interaction between the mobile device 14 and the challenge terminal 22 can be used to initiate the challenge request. In such a case, NFC technology may be used to detect the proximity/bump interaction, wherein the transferred information could be sent through the Internet to the challenge terminal 22. The illustrated challenge terminal 22, which may be any suitable computing system such as a work station, desktop computer, notebook computer, smart tablet, mobile device, etc., can receive the encrypted ID document 18 (e.g., via a wireless and/or Internet interface) and apply the decryption key 20 to the encrypted ID document 18 to obtain a decryption result 30. The illustrated decryption result 30 is output via a display 32 of the challenge terminal 22. The decryption key 20, which may be obtained offline or in real-time from a suitable key publication source or directly from the certificate authority 10 (e.g., via explicit key request), can therefore provide the requesting individual associated with the challenge terminal 22 with an additional identity verification mechanism.

More particularly, if the encrypted ID document 18 received from the mobile device 14 is anything other than the document encrypted by the certificate authority 10 using the secure encryption key 16, the decryption result 30 will be illegible, in the example shown. Indeed, the read only nature of the encrypted ID document 18 can further reduce the likelihood of tampering with the underlying photograph and/or other ID content, as already noted. Additionally, if the user 12 tampers with the decryption result 26 (FIG. 1B) shown at the presentation stage (e.g., to change the birth date on the driver's license) or shows a different ID document at the presentation stage, the requesting individual associated with the challenge terminal 22 may readily be able to see the differences between the forged ID document shown on the touch screen 24 of the mobile device 14 and the legitimate ID document shown on the display 32 of the challenge terminal 22. Thus, any forgery attempts on the part of the user 12 may be readily detected in the illustrated example.

Figure 2:
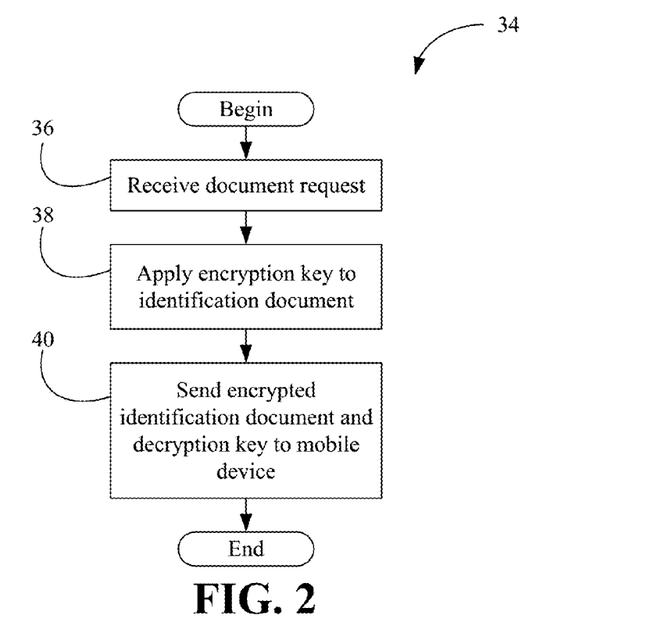
FIG. 2 is a flowchart of an example of a method of issuing an electronic ID document to a mobile device according to an embodiment.

FIG. 2 shows a method 34 of issuing an electronic ID document. The method 34 may be implemented in a server of a certificate authority such as, for example, the certificate authority 10 (FIGS. 1A-1C), already discussed. Illustrated processing block 36 provides for receiving a document request, wherein an encryption key may be applied to an ID document at block 38 in response to the document request. In one example, block 38 also involves verifying payment for the identification document by an individual associated with the document request, as well as verifying other parameters such as age, citizenship, driving record, and so forth. The encrypted ID document and a decryption key associated with the encryption key may be sent at block 40 to a mobile device, wherein the encryption key can be maintained in a secure state.

Figure 3:
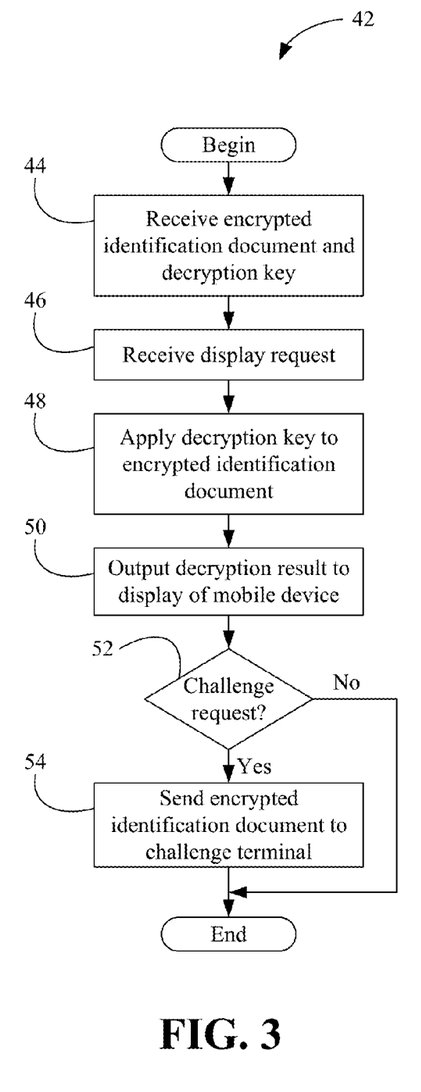
FIG. 3 is a flowchart of an example of a method of operating a mobile device according to an embodiment.

FIG. 3 shows a method 42 of operating a mobile device. The method 42 may be implemented in a mobile device such as, for example, the mobile device 14 (FIGS. 1A-1C), already discussed. Processing block 44 can provide for receiving an encrypted ID document and decryption key, wherein the received information may be stored to local memory of the mobile device. In response to receiving a display request at block 46, illustrated block 48 applies the decryption key to the encrypted ID document to obtain a decryption result. The decryption result may be output to a display of the mobile device at block 50. If it is determined at block 52 that a challenge request has been received, illustrated block 54 sends the encrypted ID document to a challenge terminal, as already discussed. In one example, the encrypted ID document is sent to the challenge terminal via a wireless interface.

Figure 4:
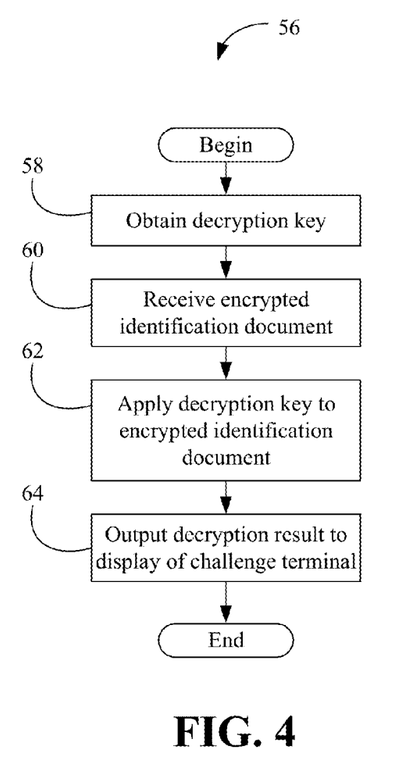
FIG. 4 is a flowchart of an example of a method of challenging an electronic ID document according to an embodiment.

FIG. 4 shows a method 56 of challenging an electronic ID document. The method 56 may be implemented in a challenge terminal such as, for example, the challenge terminal 22 (FIGS. 1A-1C), already discussed. Processing block 58 may provide for obtaining a decryption key originating from a certificate authority. Block 58 might involve obtaining the decryption key from a publication source or by sending a key request to a certificate authority server. An encrypted ID document may be received at block 60 from a mobile device in accordance with a challenge request. In one example, the encrypted ID document is received via a wireless interface such as a Bluetooth, IR, NFC interface, etc. The encrypted ID document might also be obtained via an Internet interface of the challenge terminal (e.g., using the Internet as a proxy in response to a bump interaction). Illustrated block 62 applies the decryption key to the encrypted ID document to obtain a decryption result, wherein the decryption result may be output to a display of the challenge terminal at block 64.

The person presenting the encrypted ID document could be either co-located with the challenge terminal or remote from the challenge terminal (e.g., participating in a video conferencing session). For example, the person presenting the encrypted ID document might be in the process of opening a credit card merchant account, wherein photo identification is required in order to complete the process. In such a case, the encrypted ID document may be emailed to the account authorization personnel, who may decrypt the encrypted ID document as described herein and visually verify the photograph against the person presenting the ID document in a video conferencing session. Such an approach may make it virtually impossible to forge photo IDs even in distributed/remote authentication settings.

Figure 5:
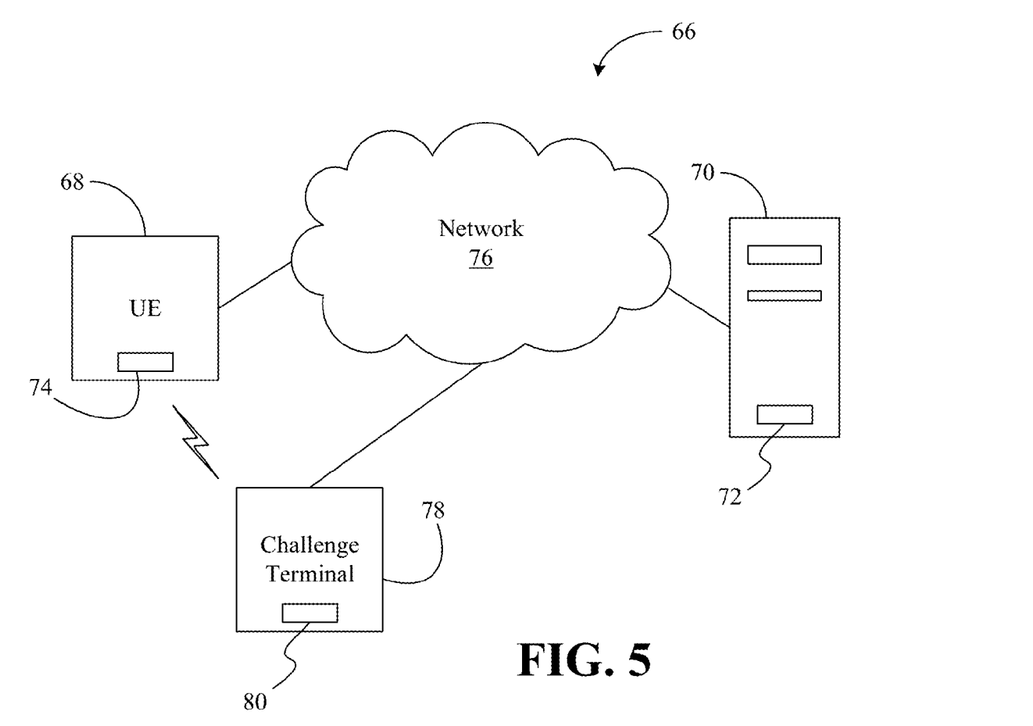
FIG. 5 is a block diagram of an example of a networking architecture according to an embodiment.

FIG. 5 shows a networking architecture 66 in which a certificate authority server 70 includes license issuing application 72 that issues an encrypted ID document and corresponding decryption key in the form of a mobile application 74 to a user equipment (UE) device 68 over a network 76. In one example, the mobile application 74 applies the decryption key to the encrypted ID document to obtain a decryption result in response to a display request, and outputs the decryption result via a display of the UE device 68. In response to a challenge request, the mobile application 74 may send the encrypted ID document to a challenge terminal 78, wherein the certificate authority server 70 may also provide the challenge terminal 78 with a third party application 80 over the network 76. In one example, the third party application 80 is configured to apply the decryption key to the encrypted ID document to obtain a decryption result, and output the decryption result to a display of the challenge terminal 78. The network 76 can itself include any suitable combination of servers, access points, routers, base stations, mobile switching centers, public switching telephone network (PSTN) components, etc., to facilitate communication between the server 70 and the UE device 68 and challenge terminal 78. The UE device 68 and the challenge terminal 78 may communicate directly over a wireless link such as, for example, a Bluetooth, IR, Wi-Fi, NFC link, etc., or indirectly through the network 76. Moreover, the UE device 68 and the challenge terminal 78 may be engaged in a bump interaction in order to initiate the challenge request, as already discussed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
    a non-transitory computer readable storage medium; and
    computer usable code stored on the computer readable storage medium, where, if executed by a processor, the computer usable code causes a challenge terminal to:
    obtain a decryption key originating from a certificate authority in order to process a display request for a visual verification, wherein the decryption key is in a form of a mobile application on a mobile device;
    receive a remotely encrypted identification document from the mobile device in accordance with a challenge request by a first individual associated with the challenge terminal, wherein the remotely encrypted identification document is to include a read only document having at least a photograph of a second individual associated with the mobile device, and wherein the remotely encrypted identification document is to be received by the challenge terminal when the mobile device is co-located with the challenge terminal or remote from the challenge terminal;
    apply, via a third party application, a copy of the decryption key to the remotely encrypted identification document to obtain a decryption result, wherein the third party application and the copy of the decryption key are received directly from the certificate authority in response to a key request; and
    output, via the third party application, the decryption result via a display of the challenge terminal, wherein the decryption result confirms whether a decrypted identification document displayed by the mobile device is trustworthy.

2. The computer program product of claim 1, wherein the decryption key is to be obtained via a publication source.

3. The computer program product of claim 1, wherein the computer usable code, if executed, causes the challenge terminal to:
    send a key request to a certificate authority server; and
    receive the decryption key from the certificate authority server.

4. The computer program product of claim 1, wherein the remotely encrypted identification document is to be received via one or more of a wireless interface of the challenged terminal and an Internet interface.

5. The computer program product of claim 1, wherein a decryption result that is the same as or substantially similar to an original identification document encrypted by the certificate authority is to represent a trustworthy decrypted identification document.

6. The computer program product of claim 1, wherein a decryption result that is illegible or substantially dissimilar to an original identification document encrypted by the certificate authority is to represent an untrustworthy decrypted identification document.

7. A method of operating a challenge terminal comprising:
obtaining a decryption key originating from a certificate authority in order to process a display request for a visual verification, wherein the decryption key is in a form of a mobile application on a mobile device;
receiving a remotely encrypted identification document from the mobile device in accordance with a challenge request by a first individual associated with the challenge terminal, wherein the remotely encrypted identification document is to include a read only document having at least a photograph of a second individual associated with the mobile device, and wherein the remotely encrypted identification document is to be received by the challenge terminal when the mobile device is co-located with the challenge terminal or remote from the challenge terminal;
applying, via a third party application, a copy of the decryption key to the remotely encrypted identification document to obtain a decryption result, wherein the third party application and the copy of the decryption key are received directly from the certificate authority in response to a key request; and
outputting, via the third party application, the decryption result via a display of the challenge terminal, wherein the decryption result confirms whether a decrypted identification document displayed by the mobile device is trustworthy.

8. The method of claim 7, wherein the decryption key is to be obtained via a publication source.

9. The method of claim 7, further including:
sending a key request to a certificate authority server; and
receiving the decryption key from the certificate authority server.

10. The method of claim 7, wherein the remotely encrypted identification document is to be received via one or more of a wireless interface of the challenged terminal and an Internet interface.

11. The method of claim 7, wherein a decryption result that is the same as or substantially similar to an original identification document encrypted by the certificate authority represents a trustworthy decrypted identification document.

12. The method of claim 7, wherein a decryption result that is illegible or substantially dissimilar to an original identification document encrypted by the certificate authority represents an untrustworthy decrypted identification document.

13. A system comprising:
a network interface;
one or more processors; and
computer usable code stored on a computer readable storage medium, where, if executed by the one or more processors, the computer usable code causes the system to:
obtain a decryption key originating from a certificate authority in order to process a display request for a visual verification, wherein the decryption key is in a form of a mobile application on a mobile device;
receive a remotely encrypted identification document from the mobile device in accordance with a challenge request by a first individual associated with the system, wherein the remotely encrypted identification document is to include a read only document having at least a photograph of a second individual associated with the mobile device, and wherein the remotely encrypted identification document is received by the system when the mobile device is co-located with the system or remote from the system;
apply, via a third party application, a copy of the decryption key to the remotely encrypted identification document to obtain a decryption result, wherein the third party application and the copy of the decryption key are received directly from the certificate authority in response to a key request; and
output, via the third party application, the decryption result via a display, wherein the decryption result confirms whether a decrypted identification document displayed by the mobile device is trustworthy.

14. The system of claim 13, wherein the decryption key is obtained via a publication source.

15. The system of claim 13, wherein the computer usable code, if executed, causes the system to:
send a key request to a certificate authority server; and
receive the decryption key from the certificate authority server.

16. The system of claim 13, wherein the remotely encrypted identification document is received via the network interface.

17. The system of claim 13, wherein the network interface is selected from a group consisting of a wireless interface and an Internet interface.

18. The system of claim 13, wherein a decryption result that is the same as or substantially similar to an original identification document encrypted by the certificate authority is to represent a trustworthy decrypted identification document.

19. The system of claim 13, wherein a decryption result that is illegible or substantially dissimilar to an original identification document encrypted by the certificate authority is to represent an untrustworthy decrypted identification document.

* * * * *